Jan. 20, 1970  R. R. BALAGUER  3,490,952
DRY CELL BATTERY

Filed Dec. 15, 1967

Jan. 20, 1970   R. R. BALAGUER   3,490,952
DRY CELL BATTERY

Filed Dec. 15, 1967   2 Sheets-Sheet 2

United States Patent Office 3,490,952
Patented Jan. 20, 1970

3,490,952
DRY CELL BATTERY
Rodolfo Rodriguez Balaguer, Fort Lauderdale, Fla., assignor to Battery Corporation of America, Hollywood, Fla., a corporation of Florida
Filed Dec. 15, 1967, Ser. No. 690,837
Int. Cl. H01m 31/00
U.S. Cl. 136—111                                     17 Claims

ABSTRACT OF THE DISCLOSURE

A flat dry cell battery in which the metal anode is a flat plate located at the center of the cell and is surrounded by a graphite or carbon cloth cathode. Battery mix is disposed between the anode and cathode on both sides of the anode. The entire cell is enclosed in an envelope which may be a fiber glass reinforced resin. Swelling of the cell or separation of the elements is inhibited by having the elements sewn together with fiber glass thread. External contact to the cloth electrode is made through a graphite rope or metal contact elements.

BACKGROUND

The present invention relates to dry cell batteries and in particular to such batteries having relatively extensive, closely spaced electrode structures, e.g., a flat cell. Such batteries, especially when made with a magnesium anode and corresponding electrochemical system, have presented a number of problems. Notable among these have been the problems of swelling, drying out, corrosion and associated contact problems and separation of elements.

The separation of elements has been found to be a particularly difficult problem and is believed to be due largely to the generation of hydrogen gas within the cell during discharge.

The principal object of the invention has been the provision of a novel and improved dry cell battery construction. In particular it has been an object of the invention to provide a novel and improved dry cell battery construction which eliminates or minimizes the foregoing problems.

An important object of the invention has been the porvision of a flat dry cell battery which may be made relatively large in area but which will have a very thin cross section.

Another object of the invention has been the provision of a dry cell battery offering superior performance characteristics at low temperatures.

A further object of the invention has been the provision of a magnesium cell which will exhibit a relatively high shelf life.

Other and further objects, features and advantages of the invention will be apparent from the following description of the invention.

SUMMARY

In accordance with the invention, there is provided a thin dry cell battery comprising an extended flat sheet of metal forming the anode, two thin layers of battery mix each substantially coextensive with one of the anode surfaces, a bibulous covering on the anode preventing direct contact between the anode and the battery mix, a first fabric envelope surrounding the anode and battery mix and having a pair of relatively extensive surfaces each in surface contact with a respective one of the layers of battery mix, the fabric envelope having at least a substantial number of carbon yarns forming the battery carbon cathode electrode, a second moisture and gas impervious envelope surrounding the first envelope, and contact means extending through the second envelope and affording external positive and negative terminals.

In accordanc with a further aspect of the invention, the second envelope includes a fiber glass reinforced plastic layer having fiber glass threads extending through the thickness of the cell to prevent separation of cell elements. In accordance with yet another aspect of the invention, the positive terminal contact means includes a carbon rope.

BRIEF DESCRIPTION OF THE DRAWINGS

The invention will now be described in greater detail with reference to the appended drawings in which.

DESCRIPTION OF PREFERRED EMBODIMENTS
OF THE INVENTION

Figure 1:
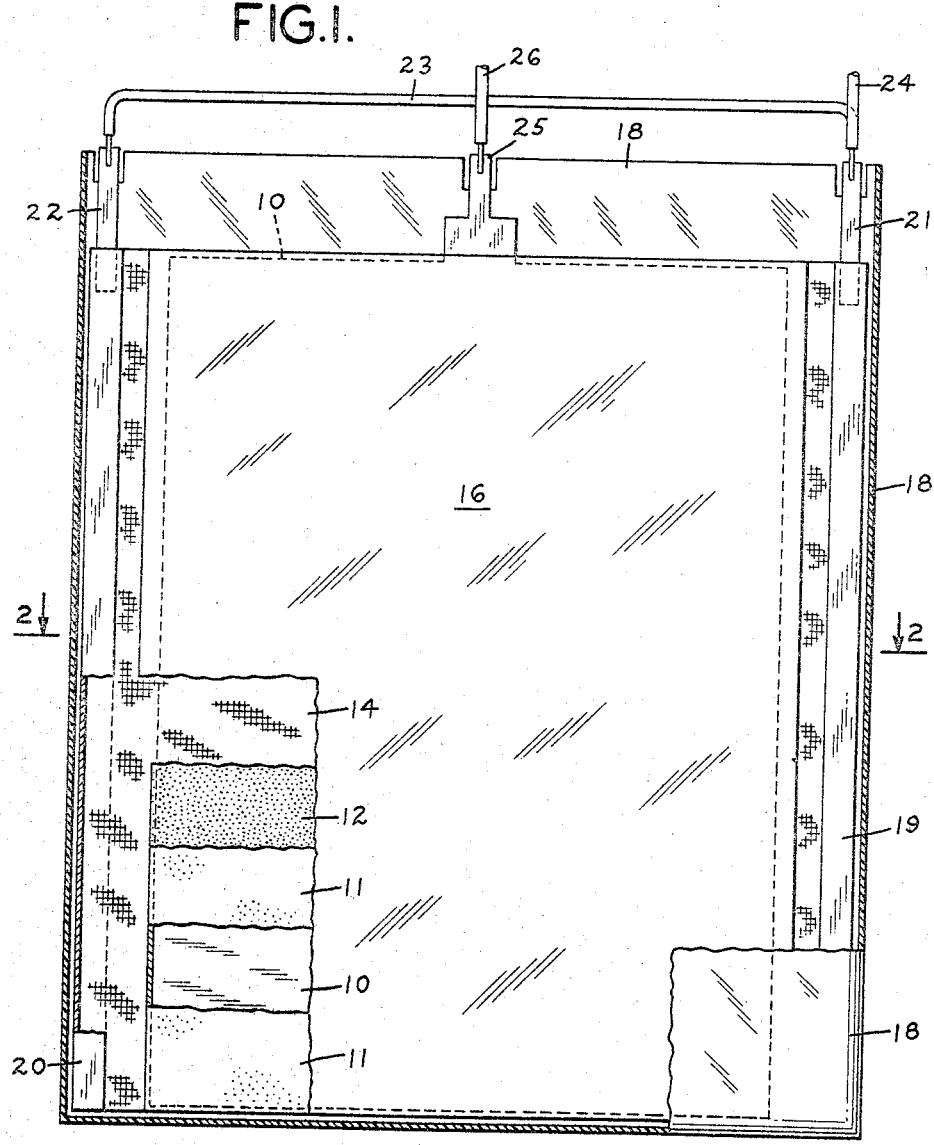
FIG. 1 is a top plan view of one embodiment of the invention with portions in section and portions broken away to illustrate the internal construction.
Figure 2:
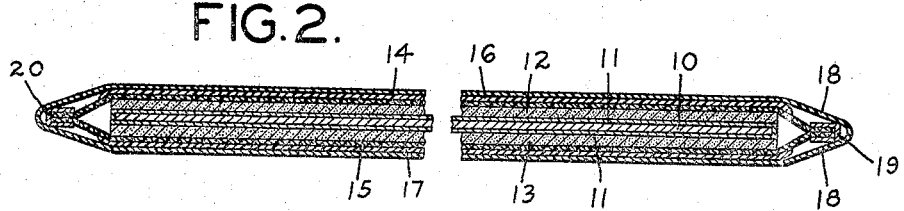
FIG. 2 is a cross sectional view taken along the line 2—2 of FIG. 1.

Referring now to the drawings and more particularly to FIGS. 1 and 2, the dry cell battery comprises a metallic battery anode 10 which is preferably magnesium and preferably in the form of a flat sheet. The anode 10 is covered on both flat surfaces and on all edges with a bibulous covering 11, e.g., a kraft paper separator, the function of which is to prevent direct contact between the anode metal and the battery mix.

Battery mix, i.e., depolarizing mix and electrolyte, is coated in layers 12 and 13 on respective sides of the anode 10. The battery mix is enclosed by sheets of carbon or graphite cloth 14 and 15 disposed on opposite sides of the anode 10 and forming a first envelope. Layers 16 and 17 of vinyl film overlie the outer surfaces of the cloth layers 14 and 15, respectively. The entire assembly is enclosed within a heat sealed plastic envelope 18 which may be of any suitable type which will resist penetration by moisture or by the corrosive products of cell discharge. One such material is the heat sealable, flexible, rubber hydrochloride sheet sold under the trademark Pliofilm.

The ends of the carbon or graphite cloth layers 14 and 15 at opposite edges are clamped between tinned steel channel shaped contact elements 19 and 20. External metal contacts 21 and 22 extend through the envelope 18 at one end of the cell and are clamped by the channels 19 and 20, respectively, to afford the external contact to the battery cathode formed by cloth layers 14 and 15. The contact elements may be joined by an insulated wire 23 and external connections to the cathode may be provided by a wire 24. A contact element 25 formed at one end of anode 10 projects outwardly through the envelope 18 and may be connected to the external circuit through a wire 26.

The meal anode 10 is preferably magnesium and might be a flat sheet of magnesium .035″ or .020″ thick and of any desired length and width, e.g., 7½″ x 3¼″. The bibulous covering 11 may be of any suitable type as is well known in the art. A salt free kraft paper has been found well suited for the purpose. Metals other than magnesium can be used, e.g., zinc.

The layers of battery mix 12 and 13 should be formed to correspond to the battery electrochemical system and preferably will be about 10% wetter than customary when used in a conventional battery. A typical battery mix composition for use with a magnesium anode would be the following, percentages being by weight:

88% type M manganese dioxide (synthetic) chemical ore
1% Mg(OH)$_2$
3% Ba(CrO$_4$)
8% acetylene black wet, 660 ml./1000 g. with 250 g./l. Mg.Br$_2$+0.25 g./l. Na$_2$CrO$_4$ For a cell having roughly twice the capacity of a standard size "D" cell about 100 grams of the battery mix would be used.

The carbon electrodes 14 and 15 are flexible, electrically conductive carbonized or graphitized fabric which is woven otherwise formed so as to have openings between the yarns. The carbon fabric may be formed by carbonizing or graphitizing a prewoven or formed cellulosic fabric or may be woven or otherwise formed from carbonized or graphitized filaments or yarns. The fabric may be prepared in any suitable way, for example as described in any of United States Patents 3,011,981 issued Dec. 5, 1961 to W. T. Stoltes, 3,107,152 issued Oct. 15, 1963 to C. E. Ford et al., and 3,116,975 issued Jan. 7, 1964 to C. B. Cross et al.

It is desirable that battery mix fill the interstices between the carbon yarns so as to maximize electrical contact between the carbon fabric and the battery mix. The reason the mix is made more moist than usual is to facilitate filling the interstices of the fabric with battery mix.

As is best shown in FIG. 2, the carbon cloth electrodes 14 and 15 approach each other at each side of the cell and are clamped together by the clamping members 19 and 20. The carbon surfaces extending from clamping elements 19 and 20 to the respective adjacent edges of the battery mix layers are preferably not coated with battery mix and preferably are waxed or otherwise treated to inhibit penetration of battery mix or corrosive products which would tend to corrode the members 19 and 20.

The inner surfaces of the vinyl film layers 16 and 17 are coated with a pressure sensitive adhesive which will adhere to the underlying carbon surface. In this way the vinyl films reinforce the carbon cloth and assist the latter in resisting expansive forces within the cell.

The flat battery construction described above and illustrated in FIGS. 1 and 2 is satisfactory for many purposes. However, a superior flat battery construction is illustrated in FIGS. 3, 4 and 5.

Figure 3:
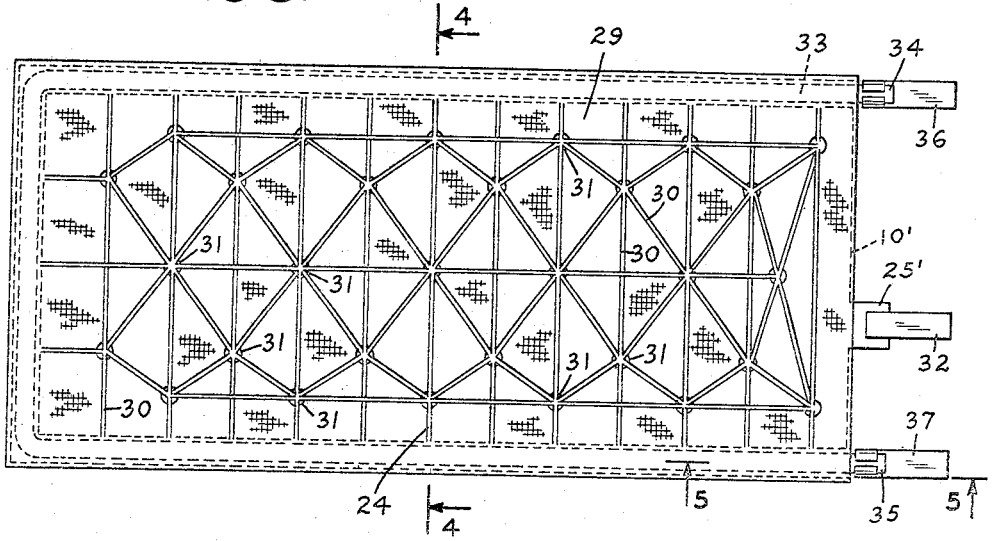
FIG. 3 is a top plan view of another embodiment of the invention.
Figure 4:
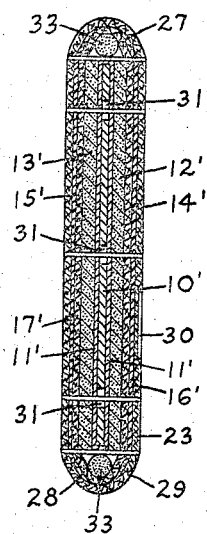
FIG. 4 is a cross sectional view taken along the line 4—4 of FIG. 3.
Figure 5:
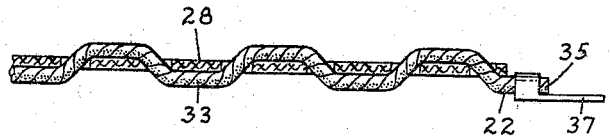
FIG. 5 is a partial sectional view taken along the line 5—5 of FIG. 3.

Referring now to FIGS. 3–5, the dry cell battery is similar in construction to the one of FIGS. 1 and 2 and like elements are given like but primed reference numerals. The cell of FIGS. 3–5 comprises a metallic anode sheet 10' which is preferably magnesium, a bibulous covering 11' covering all surfaces of the anode, layers of battery mix 12' and 13' and carbon cloth electrode layers 14' and 15'. The latter may be formed or sewn in the shape of a continuous envelope or sleeve, as shown in FIG. 4, with arcuate portions 27 and 28 joining the flat portions 14' and 15'.

Vinyl plastic films 16' and 17' having their inside surfaces coated with a pressure sensitive adhesive overlie the outer surfaces of the carbon cloth electrodes 14' and 15' respectively.

A polyester resin impregnated fiberglass cloth sheath or envelope 29 surrounds the assembly and forms a moisture proof sealing layer at all sides, the top and the bottom. The fiberglass fabric and the resin may be of the type commonly used in fiberglass reinforced resin structures, e.g., boat hulls.

In making the cell, the fiberglass fabric is preferably wrapped around the carbon cloth and vinyl as a tube with a substantial overlap, e.g., about one inch. Before the polyester resin and catalyst are applied to the fiberglass, a fiberglass thread 30 is sewn into the assembly through numerous holes 31 provided in the anode sheet 10'. The fiberglass thread 30 may be sewn in any desired pattern, a typical pattern being illustrated in FIG. 3. It is desirable that the fiberglass threads 30 extend also around the cell edges to assist in binding the entire cell into a unitary structure. It is not necessary that a single thread 30 be used since multiple threads may be employed, as desired. As many passes of the thread 30 through the cell as is desired may be made. In the limiting case sufficient thread passes may be used that the thread itself will serve as the fiberglass reinforcing fabric thereby eliminating the need for the separate fabric 29.

After the thread 30 is sewn in place, the polyester resin and catalyst are applied as a layer impregnating the fiberglass fabric and thread with which it comes into contact. The resin is allowed to harden, yielding a strong, moisture and gas proof cell closure envelope.

The battery external negative terminal is provided by a contact element 25' projecting from anode 10' and extending through the fiberglass and resin covering at one end of the cell. A suitable clip 32 may be provided for making electrical connection.

A carbon rope 33 extends down one side of the cell, along the bottom and up the other side. The rope 33 emerges from the fiberglass on both sides to form connecting tails 34 and 35 to which are clamped contact elements 36 and 37, respectively. The carbon rope 33 provides electrical contact between the carbon electrode and the outside of the cell. To enhance the contact between rope 33 and the carbon cloth it has been found desirable to sew the rope 33 through the carbon cloth in long stitches, as shown in FIG. 5.

An important advantage of the dry cell battery of FIGS. 3–5 is that no metal at all, except for anode 10', is located within the fiberglass reinforced plastic covering 29. By extending bibulous covering 11' to the plastic sealing area around projecting contact element 25', all portions of anode 10' which may come into contact with the battery mix or corrosive fluids or gases produced during cell discharge are covered with the bibulous covering and hence are protected from corrosion other than as desired for chemical reaction during cell discharge.

Another important advantage of the cell construction of FIGS. 3–5 is that the fiberglass thread 30 and the fiberglass fabric 29 serve as reinforcements to prevent cell elements from being separated, as by the action of hydrogen gas generated during cell discharge. The thread and the glass fabric are essentially bonded into a unitary assembly by the plastic. And since fiberglass is essentially unstretchable, the threads extending through the thickness of the cell bond the two sides together to resist strongly any expansion forces. The importance of resistance to separation of cell elements will be realized when it is understood that internal gas pressures in the cell tend to lift the mix away from the anode thereby increasing cell internal resistance and decreasing cell capacity.

Figure 7:
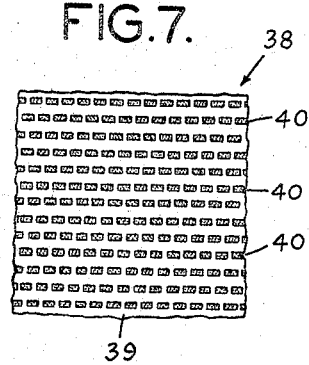
FIG. 7 is a fragmentary view illustrating a material used in the construction of FIG. 6.
Figure 6:
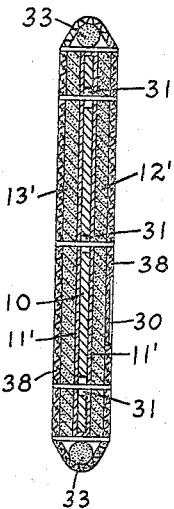
FIG. 6 is a view similar to FIG. 4 illustrating a further modification of the invention.

A modified cell construction is illustrated in FIGS. 6 and 7. This modified construction differs from that of FIGS. 3–5 only in that the carbon cloth electrode layer and the fiberglass fabric layer are replaced by a single layer 38 and the vinyl layer 16' is omitted.

The layer 38, as shown in FIG. 7, comprises a fiberglass fabric 39 in which is woven a series of parallel carbon yarns 40. The carbon yarns 40 may be formed in the same way as the carbon fabric described previously. The fiberglass and carbon fabric layer 38 should be woven sufficiently densely that the polyester resin (or other suitable plastic coating) applied to its external surface will not penetrate appreciably through the fabric and so that battery mix will not penetrate to the outside fiberglass surface before the plastic is applied and set.

With the construction of FIGS. 6 and 7 the carbon surface available for electrochemical action will be considerably less than when using a carbon cloth electrode. Nevertheless, this construction will be desirable in some instances, especially where a thinner cell is desired.

While the invention has been described in connection with specific embodiments thereof and in specific uses, various modifications thereof will occur to those skilled in the art without departing from the spirit and scope of the invention as set forth in the appended claims.

What is claimed is:
1. A dry cell battery, comprising:
 (a) an extended flat sheet of metal forming the anode of said battery and having relatively extensive opposite surfaces;
 (b) two thin layers of battery mix each substantially coextensive with a respective one of said surfaces;
 (c) a bibulous covering on said anode preventing direct contact between said anode and said battery mix;
 (d) a first fabric envelope surrounding said anode and said battery mix and having a pair of relatively extensive surfaces each in surface contact with a respective one of said layers of battery mix, said first envelope having at least a substantial number of carbon yarns in said extensive surfaces thereof and forming the carbon electrode of said battery;
 (e) a second moisture and gas impervious envelope surrounding said first envelope and preventing the loss from said battery of moisture and the products of electrochemical reactions in said battery;
 (f) first contact means in electrical contact with said anode and extending through said second envelope to afford an external negative terminal for said battery; and
 (g) second contact means in electrical contact with said carbon yarns and extending through said second envelope to afford an external positive terminal for said battery.

2. A dry cell battery as set forth in claim 1 in which said first fabric envelope is formed from two sheets of electrically conductive carbon cloth and in which said second contact means comprises a pair of elongated C-shaped metallic channel members disposed at opposite edges of said battery and each clamping together a respective end edge of each of said sheets of carbon cloth.

3. A dry cell battery as set forth in claim 1 in which said second envelope is formed from two layers of plastic material each being resistant to corrosive materials in said battery mix and produced during cell discharge.

4. A dry cell battery as set forth in claim 3 in which the inner one of said layers of plastic material is a vinyl plastic and in which the inner surface of said one layer is coated with a pressure sensitive adhesive in contact with the outer surface of said carbon cloth.

5. A dry cell battery as set forth in claim 1 in which said anode is formed from a sheet of magnesium.

6. A dry cell battery, comprising:
 (a) an extended flat sheet of metal forming the anode of said battery and having relatively extensive opposite surfaces;
 (b) two thin layers of battery mix each substantially coextensive with a respective one of said surfaces;
 (c) a bibulous covering on said anode preventing direct contact between said anode and said battery mix;
 (d) a first electrically conductive carbon fabric envelope surrounding said anode and said battery mix and having a pair of relatively extensive surfaces each in surface contact with a respective one of said layers of battery mix, said first envelope forming the carbon electrode of said battery;
 (e) a second moisture and gas impervious envelope surrounding said first envelope and preventing the loss from said battery of moisture and the products of electrochemical reactions in said battery, said second envelope being formed from a fiberglass reinforced plastic polymerized resin;
 (f) first contact means in electrical contact with said anode and extending through said second envelope to afford an external negative terminal for said battery; and
 (g) second contact means in electrical contact with said carbon yarns and extending through said second envelope to afford an external positive terminal for said battery.

7. A dry cell battery as set forth in claim 6 in which a fiberglass thread is sewn in a multiplicity of stitches through said cell joining opposite surfaces of said fiberglass fabric and the interior of said cell into a unitary body which will resist expansive forces and the separation of cell elements from gas generated during cell discharge, said anode having a multiplicity of holes to permit passage of said thread therethrough.

8. A dry cell battery as set forth in claim 7 in which some of said stitches extend around the outer edges of said battery but within the plastic layer.

9. A dry cell battery as set forth in claim 7 in which said plastic is a polyester resin.

10. A dry cell battery as set forth in claim 6 in which said second contact means comprises an electrically conductive carbon rope in extensive contact with said carbon fabric around the periphery of said cell and having an end extending through said fiberglass reinforced plastic envelope.

11. A dry cell battery as set forth in claim 10 in which said first contact means comprises an integral extension of said anode projecting outwardly through said fiberglass reinforced plastic envelope, all portions of said anode within said plastic envelope being covered with said bibulous covering, said anode being the only metal within said plastic envelope.

12. A dry cell battery as set forth in claim 10 in which said carbon rope is sewn through said carbon fabric in a series of long stitches.

13. A dry cell battery as set forth in claim 6 having an additional vinyl plastic envelope interposed between said carbon envelope and said fiberglass reinforced plastic envelope, said vinyl plastic envelope having a coating of pressure sensitive adhesive on the inner surface thereof in contact with the outer surface of said carbon envelope.

14. A dry cell battery as set forth in claim 13 in which said fiberglass fabric has an open weave permitting penetration therethrough of the resin prior to polymerization thereof.

15. A dry cell battery, comprising:
 (a) an extended flat sheet of metal forming the anode of said battery and having relatively extensive opposite surfaces;
 (b) two thin layers of battery mix each substantially coextensive with a respective one of said surfaces;
 (c) a bibulous covering on said anode preventing direct contact between said anode and said battery mix;
 (d) a first fabric envelope surrounding said anode and battery mix and having a pair of relatively extensive surfaces each in surface contact with a respective one of said layers of battery mix, said first envelope being formed from a densely woven fiberglass fabric having a multiplicity of carbon yarns woven therein at spaced locations, said carbon yarns in said extensive surfaces of said fabric forming the carbon electrode of said battery;
 (e) a second moisture and gas impervious envelope surrounding said first envelope and preventing the loss from said battery of moisture and the products of electrochemical reactions in said battery, said second envelope being formed from a polymerized resin plastic coated on the outer surface of said fabric and polymerized in situ;
 (f) first contact means in electrical contact with said anode and extending through said second envelope to afford an external negative terminal for said battery; and (g) second contact means in electrical contact with said carbon yarns and extending through said second envelope to afford an external positive terminal for said battery.

16. A dry cell battery as set forth in claim 15 in which said anode has a multiplicity of holes and in which a fiberglass thread is sewn through said holes and said fabric in a multiplicity of stitches bonding said cell into a unitary structure upon polymerization of said resin.

17. A dry cell battery as set forth in claim 16 in which said second contact means comprises an electrically conductive carbon rope in extensive contact with said carbon yarns around the periphery of said cell, said carbon rope having an end projecting outwardly through said plastic envelope to afford an external contact for said carbon electrode.

References Cited

UNITED STATES PATENTS

| | | | |
|---|---|---|---|
| 2,666,802 | 1/1954 | Woodring et al. | 136—111 |
| 2,870,235 | 1/1959 | Soltis | 136—111 |
| 2,995,614 | 8/1961 | Krueger | 136—111 |
| 3,081,371 | 3/1963 | Toda et al. | 136—111 |
| 3,174,880 | 3/1965 | Buitkus | 136—83 |

WINSTON A. DOUGLAS, Primary Examiner

A. SKAPARS, Assistant Examiner

U.S. Cl. X.R.

136—100